US007983227B2

(12) United States Patent
Nakahara et al.

(10) Patent No.: US 7,983,227 B2
(45) Date of Patent: Jul. 19, 2011

(54) COMMUNICATION TERMINAL APPARATUS, COMMUNICATION CONNECTION APPARATUS, AND COMMUNICATION METHOD USING THEM

(75) Inventors: Naruhito Nakahara, Yokohama (JP); Hitomi Teraoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1183 days.

(21) Appl. No.: 10/590,498

(22) PCT Filed: Feb. 22, 2005

(86) PCT No.: PCT/JP2005/002811
§ 371 (c)(1),
(2), (4) Date: Aug. 24, 2006

(87) PCT Pub. No.: WO2005/081471
PCT Pub. Date: Sep. 1, 2005

(65) Prior Publication Data
US 2008/0095084 A1 Apr. 24, 2008

(30) Foreign Application Priority Data

Feb. 25, 2004 (JP) ................................ 2004-048952

(51) Int. Cl.
*H04W 4/00* (2009.01)
(52) U.S. Cl. ........ 370/338; 370/328; 370/329; 370/337; 370/341; 370/347; 370/349; 370/355; 370/356; 370/395.52; 455/410; 455/411; 455/435.1; 709/228; 709/229; 380/247; 380/248
(58) Field of Classification Search .................. 370/389, 370/391, 392, 393, 474, 461–469, 328, 329, 370/337, 341, 347, 349, 355, 356, 395.52, 370/400, 458; 455/435.1
See application file for complete search history.

(56) References Cited

U.S. PATENT DOCUMENTS

| 6,041,042 | A  | * | 3/2000  | Bussiere ........................ 370/245 |
| 6,487,218 | B1 | * | 11/2002 | Ludwig et al. ................. 370/469 |
| 6,490,294 | B1 | * | 12/2002 | Manzado et al. ............. 370/465 |
| 7,308,260 | B2 | * | 12/2007 | Mandayam et al. ....... 455/435.1 |

FOREIGN PATENT DOCUMENTS

JP 2002-232497 8/2000

(Continued)

OTHER PUBLICATIONS

3Gpp@ X.Soo11-C cdma2000 Wireless IP network Standard.

(Continued)

*Primary Examiner* — Nick Corsaro
*Assistant Examiner* — Amanuel Lebassi
(74) *Attorney, Agent, or Firm* — Antonelli, Terry, Stout & Kraus, LLP.

(57) ABSTRACT

In the conventional network using the PPP stipulated by RFC1661, the LCP phase to establish an LCP link, the authentication phase, and the NCP phase such as address assignment processing of the NCP are sequentially conducted each time the line connection is performed, and hence the connection takes a certain period of time. Particular, in the case of the mobile communication, there is often performed operation in which connection and disconnection are frequently conducted in a short period of time, and hence when the operation up to the connection takes a long period of time, the usability is deteriorated. Therefore, a need exists for a configuration of an apparatus and a communication method to reduce the connection time. In the configuration, control information such as authentication policy and protocols for use beforehand determined in the communication system are set to each apparatus to conduct communication such that the respective processing phases of the LCP, authentication, and NCP processing phases are executed in parallel according to the values set as above. Also, in the configuration, the communication between the apparatuses is conducted using a combined PPP packet created by combining with each other the respective packets of the LCP, authentication, and NCP packets as the PPP packets to be communicated in the respective phases to thereby perform the PPP connection.

17 Claims, 13 Drawing Sheets

FOREIGN PATENT DOCUMENTS

| JP | 2001-086156 | 3/2001 |
| JP | 2002-501331 | 1/2002 |
| JP | 2003-060675 | 2/2003 |

OTHER PUBLICATIONS

RFC1661 3.2 Phase Diagram.

* cited by examiner

COMMUNICATION TERMINAL APPARATUS, COMMUNICATION CONNECTION APPARATUS, AND COMMUNICATION METHOD USING THEM

This application claims priority from Japanese Patent Application JP 2004-048952 filed on Feb. 25, 2004, the content of which is hereby incorporated by reference into this application.

TECHNICAL FIELD

The present invention relates to a communication terminal apparatus, a network access apparatus, and a communication method using them for use in a packet communication system and a mobile communication system using a Point to Point Protocol (PPP).

BACKGROUND ART

Recently, in the packet communication system and the mobile communication system, there is increasingly conducted data communication for mail transmission and reception, access to the internet, and Web browsing using a mobile station. To implement such data communication, for the data communication between a terminal and a Packet Data Serving Node (to be referred to as PDSN or access server hereinbelow), it is common practice to use a Point to Point Protocol (to be referred to as PPP hereinbelow) stipulated by RFC1661 (reference is to be made to, for example, 3GPP2 X.S0011-C cdma2000 Wireless IP network Standard). It is the function of the PPP to assuredly connect the apparatuses to each other to transfer an IP packet therebetween. In the mobile communication system, when a mobile station sends an IP packet to a content server as an access destination, the communication is conducted between the mobile station and the PDSN using a PPP packet created by adding a PPP header to the IP packet. The PDSN removes the PPP header from the PPP packet to restore the PPP packet to the IP packet. From the PDSN, the IP packet is routed through the IP packet communication to the content server as a transmission destination.

The basic operations using the PPP include operations for connection and disconnection between the apparatuses. In phases respectively called a link establishment phase, a user authentication phase, a network-layer protocol phase, and a link termination phase, PPP packets corresponding to the respective phases are communicated between the apparatuses to thereby implement the connection and disconnection therebetween. In this regard, the Link Control Protocol (to be referred to as LCP hereinbelow) phase is used to establish a data link after a physical line is completely connected. Also, the user authentication phase is a phase to conduct user authentication, for example, qualification or non-qualification of an access right for a connection request source. Moreover, the Network Control Protocol (to be referred to as NCP hereinbelow) is a phase, for example, to release a network using the NCP, and the link termination phase is a phase to terminate the PPP link.

In a more detailed description, the PPP includes two protocols, i.e., LCP and NCP. The LCP is a protocol to control link establishment and to control user authentication on assumption that a physical line has been connected. The NCP is a protocol has a function to conduct assignment of addresses to be used by a layer-3 protocol (network-layer protocol), and if the network layer is based on, for example, an Internet Protocol (IP), the protocol includes a function to assign an IP address.

In the conventional network connection, as stipulated by Phase Diagram in Section 3.2 of RFC1661 (The Point-to-Point Protocol), a sequential procedure is employed to conduct network connection from a terminal. The terminal issues a call to the PDSN, the link establishment processing and the authentication processing are executed by the LCP and the assignment processing of addresses to be used in the network layer is executed by the NCP to thereby completely achieve the connection to the network.

Additionally, as a technique to shorten the communication procedure, JP-A-2000-232497 has disclosed a technique in which information required in subsequent negotiation is beforehand transmitted in preceding negotiation to reduce the number of the subsequent negotiation steps to thereby shorten the connection time.

DISCLOSURE OF INVENTION

Problem to be Solved by the Invention

As described above, in the connection and disconnection control using the PPP in the network of the prior art, there are sequentially conducted the LCP phase for the LCP link establishment, the authentication phase, and the NCP phase such as the address assignment processing by the NCP for each line connection. That is, unless the LCP phase is finished, the process cannot go to the authentication phase; and unless the final NCP phase is finished, the PPP connection cannot be completed. Therefore, the connection requires a considerably long period of time.

Particularly, in the case of the mobile communication system, since moving terminals conduct communication, a handover requiring re-connection using the PPP frequently takes place. That is, the connection and disconnection frequently occurs in a short period of time. If a long period of time is required to complete the PPP connection, the usability is deteriorated, and there appears a chance of occurrence of a long uncommunicable time.

Furthermore, in a mobile communication system in which the handover frequently takes place and hence a connection destination (access server) frequently changes, the technique described in JP-A-2000-232497 cannot be expected to lead to an advantage that the connection time is remarkably reduced.

An object of the present invention is to provide a communication terminal apparatus, a network access apparatus, and a communication method using them in which the problem is solved and the connection time can be reduced in the network connection.

Means for Solving the Problem

The communication system using the PPP is a system in which the link establishment, the authentication, and the protocol selection and the address assignment in the upper-layer described above are determined by communicating PPP packets between the apparatuses. However, in a communication system actually being operated, the authentication policy and the protocols to be used are beforehand determined as part of the system or are beforehand determined between the apparatuses in many cases. The present inventor has devised the present invention by recognizing a situation, i.e., if authentication types and protocols are beforehand determined and are stored as system setting values of respective apparatuses in the system, the connection and disconnection control using the PPP as stipulated in RFC1661 is feasible even when the respective phases conducted by the above connection and disconnection using the setting values, that is, the connection time can be reduced in the network connection.

Specifically, the communication terminal apparatus and the network access apparatus disposed in the communication system are configured such that information regarding the PPP control beforehand determined in the system or between the apparatuses is accumulated and the respective apparatuses conduct a plurality of control phases in parallel executed under control of the PPP on the basis of the accumulated information. Additionally, in the configuration, each apparatus combines information items resultant from execution of the plural control phases to transmit the information items to an apparatus as a communication partner. Also, when the combined information items regarding the control phases are received, each apparatus in configuration discriminates the information items of the respective control phases from each other and develops the information items to conduct the plural control phases in parallel.

In more detail, a communication terminal apparatus to be connected to a communication network through a control operation using a PPP includes a phase information combination section for combining a plurality of control phase information items regarding the PPP with each other, an encapsulation section for converting data created by the phase information combination section to conform to the communication network, and a data transmission section to transmit the data converted by the phase information combination section via the communication network to a communication apparatus as a destination. Moreover, a communication terminal apparatus to be connected to a communication network using a PPP includes a plurality of phase processing sections for executing a plurality of control processings for the PPP connection in parallel, a data receiving section for receiving data via the communication network from a communication partner, a packet development section for discriminating a phase information item in the data received by the receiving section and transmitting the phase information item to a phase processing section conforming thereto, a phase information combination section for receiving the phase information items processed by the plural phase processing sections and combining the plural phase information items with each other, an encapsulation section for converting data created by the phase information combination section to conform to the communication network, and a data transmission section for transmitting the data converted by the encapsulation section via the communication network to the communication partner.

In addition, a network access apparatus also includes a phase information combination section for combining a plurality of control phase information items regarding the PPP with each other, an encapsulation section for converting data created by the phase information combination section to conform to the communication network, and a data transmission section to transmit the data converted by the encapsulation section to the communication terminal apparatus. Furthermore, a network access apparatus also includes a plurality of phase processing sections for executing a plurality of control processings for the PPP connection in parallel, a data receiving section for receiving data via the communication terminal apparatus, a packet development section for discriminating a phase information item in the data received by the receiving section and transmitting the phase information item to a phase processing section conforming thereto, a phase information combination section for receiving the phase information items processed by the plural phase processing sections and combining the plural phase information items with each other, an encapsulation section for converting data created by the phase information combination section to conform to the communication network, and a data transmission section for transmitting the data converted by the encapsulation section via the communication network to the communication terminal apparatus.

Moreover, there is used a communication method between a communication terminal apparatus and a network access apparatus including the steps of executing, by a transmission-side apparatus, a plurality of control processings for the PPP connection in parallel; creating a plurality of information items regarding control phases; and transmitting first data created by combining the plural information items, via the communication network to a receiving-side apparatus; and discriminating, by the receiving-side apparatus, respective information items in the received first data created by combining the plural information items; executing a plurality of control processings corresponding to the information items in parallel; and transmitting second data created by combining information items regarding plural control results, via the communication network to the transmission-side apparatus.

Advantages of the Invention

Since a plurality of PPP packet processings are executed in parallel and PPP packets communicated for these processings are combined and transmitted in the configuration, the PPP connection time can be reduced as compared with the conventional connecting processing technique using the PPP. In addition, in a mobile communication system, even when the connection destination (access server) is changed and the handover requiring the re-connection of the PPP takes place, the uncommunicable time can be reduced since it is possible to reduce the PPP connection time.

The other objects, features, and advantages of the present invention will become apparent from the following detailed description of embodiments associated with accompanying drawings.

BEST MODE FOR CARRYING OUT THE INVENTION

Next, referring to drawings, description will be given of a communication terminal apparatus, a network access apparatus, and a communication method of a communication system using them in accordance with the present invention.

FIG. 1 is a network configuration diagram showing a configuration example of a communication system using a communication terminal apparatus and a network access apparatus of the present invention. The mobile communication system includes a mobile station 100, a base station 400 to connect the mobile station 100 to a wireless link, an access server (or PDSN) as a network access apparatus to conduct PPP connection via a provider network 410 with the mobile station 100, an authentication server 800 to access the access server 200 at authentication, and a content server 801 which are connected via a public network 420 to the access server 200 and in which contents, for example, regional information items are stored, and which supplies the contents to mobile stations. The packet communication system includes a client terminal 300 and an access server 200 in which the PPP connection is implemented between the client terminal 300 and the access server 200 like in the mobile system.

The mobile station 100 and the client terminal 300 conduct, in response to a connection start operation, connection control with the access server 200 using the PPP, which will be described later, and then conduct data communication of a PPP packet in which an IP packet is encapsulated to connect via the provider network 410 and the access server 200 to the public network (e.g., the internet), and hence can browse the contents in a content server 801 connected to the public network. In this regard, the provider network 401 is a network managed by a service provider, and the access server 200 is also managed by the service provider in many cases. Also, in an actual communication system, a PPP packet is encapsulated in frame data to which a header and a footer are added as in an HDLC-Like-frame stipulated by RFC1662, and the PPP packet is communicated between the mobile station 100 and the access server 200. In the following description, the mobile system shown in FIG. 1 is used as an example for the explanation.

FIG. 2 is a functional configuration diagram showing a functional configuration example of a mobile station. The mobile station 100 includes a wireless processing section 104 to conduct communication in a wireless session with the base station 400, a PPP processing section 110 to establish PPP connection to the access server 200, an IP processing section 102 to process an IP packet, and finally an application section 101 to process applications.

The PPP processing section 110 further includes a data receiving section 111 to receive frame data from the wireless processing section 104, a capsule development section 112 which removes a data link capsule (e.g., the header and the footer of the HDLC-Like-framing) from the received frame data to obtain data, a phase development section 113 which extracts, from the data obtained from the capsule, PPP packets corresponding to respective phases to transfer the PPP packets to an LCP phase section 114, an authentication phase section 115, and an NCP phase section 116; an LCP phase section 114 to execute LCP processing of the PPP, an authentication phase section 115 to execute authentication processing, an NCP phase section 116 to execute NCP processing, a phase combination section 117 which waits for packets received from the respective phase sections to combine the packets with each other into one packet, an encapsulation section 118 to encapsulate data in which respective phase information items are combine with each other into a capsule of frame data (e.g., an HDLC-Like-framing) conforming to the provider network, and a data transmission section 119 to transmit the encapsulated frame data to the wireless processing section 104. In this connection, the capsule development section 112 and the phase development section 113 may be implemented as one function 120.

Additionally, the phase development section 113 includes a function to transfer, in a case in which it is determined that the contents of the PPP packet are an IP packet, the packet to the IP processing section 102, and the phase combination section 117 also includes a function to transfer the IP packet received from the IP processing section 102 to the encapsulation section 118. Therefore, after the PPP connection is completed, data such as data of internet communication is transferred through the route described above to the application processing section 101 and the wireless processing section 104, not through the respective phase sections.

FIG. 3 is a functional configuration diagram showing a functional configuration example of the network access apparatus (access server). The access server 200 includes a provider-side physical layer (PHY) 201 as an interface for the provider network 410, a wireless IF processing section 202 to establish a session, stipulated in the mobile system, with the provider network 410, a PPP processing section 210 to conduct PPP connection with the mobile station 100, an authentication server interface (IF) 204 as an interface to access the authentication server 800 in the PPP authentication phase, an IP processing section 205 to process an IP packet transferred according to the PPP, and an IP-side PHY 206 as an interface to transfer data to the internet network 420.

The PPP processing section 210 has a configuration almost the same as that of the PPP processing section 110 of the mobile station 100 described above and includes a data receiving section 212 to receive frame data from the wireless IF processing section 202, a capsule development section 212 which removes a data link capsule from the received frame data to obtain data, a phase development section 213 which develops the PPP packet after capsule development for respective phases and which transfers the PPP packets to an LCP phase section 214, an authentication phase section 215, and an NCP phase section 216; an LCP phase section 214 to execute LCP processing of the PPP, an authentication phase section 215 to execute authentication processing, an NCP phase section 216 to execute NCP processing, a phase combination section 217 to combine the PPP packets received from the respective phase sections, an encapsulation section 218 to encapsulate the PPP packet into frame data conforming to the provider network 410, and a data transmission section 219 to transmit the encapsulated frame data to the wireless IF processing section 202. Moreover, the phase development section 213 also includes a function to transfer, in a case in which it is determined that the contents of the PPP packet are an IP packet, the packet to the IP processing section 205, and the phase combination section 217 also includes a function to transfer data received from the IP processing section 205 to the encapsulation section 218.

Incidentally, the respective functional blocks such as the PPP processing sections 110 and 210, the IP processing sections 102 and 205, and the application processing section 101 disposed in the mobile station and the access server shown in FIGS. 2 and 3 are implemented by a processor (CPU), not shown, and software accumulated in a memory or the like. Also, part of the functions may be implemented by hardware in the configuration. In the description below, it is assumed that the respective functional blocks are driven by a CPU and hardware to conduct operation of apparatuses such as connection control using the PPP. Moreover, it is assumed in the configuration that the system setting values and control parameters (information items of authentication policy and protocols for use, which will be described later) necessary for operation of the respective functional blocks are beforehand set to memories of the respective apparatuses by operation of the owners and/or operators of the respective apparatuses, and the respective functional blocks conduct operations, which will be described later, using these values.

Next, by further referring to the drawings, description will be given in detail of operation of the mobile station, the access server, and the communication system using them. FIG. 4 is a frame layout diagram showing a layout example of a PPP packet. Each PPP packet includes, as stipulated by RFC161, a protocol field 511 to identify a type of a packet such as an LCP packet, an authentication packet, or an NCP packet; a code field 512 indicating whether the packet type is a request or a reply, an ID 513 as an identifier of the packet, a length 514 indicating the length of the packet, and an option 515 to store data to be communicated between the apparatuses. Although the function and the layout of each packet will be described later, a value is set to the protocol field 511 such that "C021" is set for an LCP packet, "C023" or "C223" is set for an authentication packet, and "8021" is set for an NCP packet according to the policy of RFC1661.

FIG. 5 is an operation sequence diagram to explain operation of the communication system and represents signal transmission and communication between the station 100 and the access server 200. FIG. 6 is an operation flow showing an operation example (a transmission-side operation example) of the station, and FIG. 7 is a frame layout diagram showing a layout example of frame data which the mobile station transmits to the access server. Also, FIG. 8 is an operation flow diagram showing an operation example (a receiving-side operation example) of the access server and FIG. 9 is a frame layout diagram showing a layout example of frame data which the access server transmits to the mobile station. Additionally, FIG. 10 is a frame layout diagram showing a layout example of another frame data item which the mobile station transmits to the access server, and FIG. 11 is a frame layout diagram showing a layout example of another frame data item which the access server transmits to the mobile station.

In operation using the PPP, the mobile station 100 and the access server 200 respectively and concurrently operate to communicate various types of regular PPP packets, which results in connection and disconnection between the apparatuses. However, in the following paragraphs, by first referring to FIGS. 4 to 11, description will be given mainly of operation in which the mobile station transmits a PPP packet to the access server.

(1) The mobile station 100 indicates, in response to a call issuance request from a user, a wireless session establishment request to the wireless processing section (104 of FIG. 2) to establish a wireless session via the base station 400 and the provider network 410 to the access server 200 (150 of FIG. 5). Incidentally, in the access server 200, the wireless IF processing section (202 of FIG. 3) executes establishment processing for a wireless session via the provider-side PHY (201 of FIG. 3).

(2) When the wireless session 150 is completely established, a connection start indication is issued to the PPP processing section (110 of FIG. 2) such that the PPP connection is started between the mobile station 100 and the access server 200 as below.

First, the processing start is notified in parallel to the respective phase sections, i.e., the LCP phase section 114, the authentication phase section 115, and the NCP phase section 116. In the conventional connection operation using the PPP, since the LCP phase section determines an authentication type to be used in the authentication phase, it is necessary that after the LCP phase is completed, the process goes to the authentication phase, that is, after the authentication phase is finished, the NCP phase notifies an address in the configuration. However, in the communication system of the present invention, paying attention to the situation that the authentication policy to be used and the protocols for use in the upper layers are beforehand determined in many cases, the authentication policy and the protocols are beforehand stored in the station 100 and the access server 200 such that based on the information, the respective phase sections, i.e., the LCP phase section 114, the authentication phase section 115, and the NCP phase section 116 can be operated in parallel.

For example, in a case in which an authentication policy called Challenge-Handshake Authentication Protocol (CHAP) stipulated by RFC1994 is used for authentication, since the policy has been stored, in parallel with an operation to notify that the authentication policy is CHAP to an option of the LCP packet (6105 of FIG. 7), an authentication packet (6108 of FIG. 7) is created according to the stored authentication policy. As a result, the authentication phase (692 of FIG. 5), which conventionally operates to create the authentication packet after the LCP phase (691 of FIG. 5) is completed and the authentication policy is determined, operates in concurrence with the LCP phase, and hence the connection time can be reduced. Furthermore, if the protocol used by the upper layer is an Internet Protocol (IP), since this protocol type has been stored in advance, the NCP phase (693 of FIG. 5) conventionally operating to notify an IP address after the authentication phase (692 of FIG. 5) is completed also operates, on the basis of the protocol type, in concurrence with the LCP phase and the authentication phase, and hence the connection time can be further reduced.

Specifically, the PPP processing section (110 of FIG. 2) including the respective phase sections having received notification of the processing start operates as below.

(a) The LCP phase section (114 of FIG. 2) determines an option to be used in the LCP packet according to the system setting value set in advance (1141 of FIG. 6). Thereafter, the LCP phase create an LCP packet (6105 of FIG. 7) including the option based on RFC1661 and then transfers (1142 of FIG. 6) the LCP packet to the phase combination section (117 of FIG. 2).

(b) The authentication phase section (115 of FIG. 2) checks the authentication type set by the system in advance (1151 of FIG. 6). As authentication types, there have been known CHAP described above and Password Authentication Protocol: RFC1334 (PAP) stipulated by RFC1334, and in this embodiment, description is given of operation according to an example using CHAP.

As already described, in the operation using the PPP, the station 100 and the access server 200 respectively and concurrently operate to communicate various types of regular PPP packets. Although details will be described later, the authentication policy and the protocols for use have been similarly set also in the access server 200 like the station 100 and hence the respective phases are concurrently operating. Therefore, if the authentication type is CHAP, information of CHAP-Challenge determined by RFC1994 is sent from the access server 200. The authentication phase section of the station 100 confirms reception of the CHAP-Challenge (1152 and 1153 of FIG. 6) and then creates an authentication packet (6108 of FIG. 7) including the option on the basis of RFC1661 to transfer the authentication packet (1154 of FIG. 6) to the phase combination section (117 of FIG. 2).

(c) The NCP phase section (116 of FIG. 2) like the other phase sections also generates, after determining an option (1161 of FIG. 6) according to the predetermined system setting value, an NCP packet (6111 of FIG. 7) including an IPCP option since IP is used in this embodiment, and then transfers the NCP packet to the phase combination section (117 of FIG. 2).

(d) The phase combination section (117 of FIG. 2) combines the PPP packets transferred from the respective phase processing sections through phase information combination processing (1171 of FIG. 6) as below.

The combination section 117 beforehand recognizes, according to beforehand stored information, from which one of the phase sections the PPP packet is to be received and waits for a state in which necessary packets, i.e., an LCP packet 6105, an authentication packet 6108, and an NCP packet 6111 can be received from the LCP phase section 114, the authentication phase section 115, and the NCP phase section 116. The phase combination section 117 confirms a packet in the protocol file (511 of FIG. 4) of each packet, calculates the last data field of the packet according to the length 514, and then executes combination processing for the respective packets. In this embodiment, the LCP packet 6105, the authentication packet 6108, and the NCP packet 6111 are linked with each other as shown in FIG. 7. After the packet combination is finished for all packets, the phase combination section 117 transfers the data to the encapsulation section (118 of FIG. 2).

(e) The encapsulation section (118 of FIG. 2) encapsulates the data (data in which the respective PPP packets are linked with each other) created by the phase combination section 117, through encapsulation processing (1181 of FIG. 6) using a header and a footer matching with a link layer used in the communication system. If the data is to be encapsulated into an HDLC-Like framing stipulated in RFC1662, there is created one HDLC-Like-frame data 6100 as shown in FIG. 7 in which an HDLC header 6101 is added at a first position of the LCP packet 6105, the authentication packet 6108, and the NCP packet 6111 which are linked with each other and an HDLC footer 6114 is added at a last position thereof. Incidentally, the HDLC header and the HDLC footer are stipulated in RFC1662 and include a flag 6102, an address 6103, control 6104, RCS 6115, and a flag 6116. Furthermore, since the first (protocol field (511 of FIG. 4) of the LCP packet 6105 contains "C021", although the PPP packets are linked with each other, the associated item can be identified as an LCP packet. The authentication packet 6108 and the NCP packets 6111 can also be similarly identified.

The data transmission section (119 of FIG. 2) changes the frame data 6100 into a wireless format stipulated by the communication system and transmits the data via the wireless processing section (104 of FIG. 2) to the base station 400. The frame data arrives at the access server 200 via the base station 400 and the provider network 410 (610 of FIG. 5).

(3) In the access server 400, the provider-side PHY (201 of FIG. 3) receives the frame data 6100 to transfer the data via the wireless IF processing section (202 of FIG. 3) to the data receiving section (211 of FIG. 3). Specifically, the wireless IF processing section 202 obtains HDLC-Like-frame data 6100 from the format stipulated by the mobile system to transfer the data to the data receiving section 211 of the PPP processing section (210 of FIG. 3). The reception data section 211 waits for reception of the HDLC-Like-Frame (701 of FIG. 8). This configuration is used because the HDLC-Like-Frame is subdivided into several partitions for the transfer thereof depending on the mobile systems, and it is required to accumulate data items (to wait for) for completion of assembly of the HDLC-Like-Frame. The capsule development section (212 of FIG. 3) removes the HDLC header 6101 and the HDLC footer 6114 from the HDLC-Like-Frame data 6100 such that the data including the combination of the PPP packets is transmitted (717 of FIG. 8) to the phase development section (213 of FIG. 3).

The phase development section 213 identifies, in the data including the PPP packets combined with each other, the PPP packets created in the respective phase processing sections of the station 100 to transfer these PPP packets to the associated phase processing sections (750 of FIG. 8). In the embodiment, the phase development section 213 first checks the protocol field (6106 of FIG. 7) to determine that the packet is an LCP packet according to "C021", calculates the data length of the LCP packet 6105 using the length (514 in FIG. 4; not shown in FIG. 7) contained in the field 6107 to obtain the LCP packet, and then sends the LCP packet to the LCP phase section (214 of FIG. 3). Subsequently, the phase development section 213 similarly determines that the packet is an authentication packet 6108 since the protocol field (6109 of FIG. 7) of the next PPP packet contains "C223" and then transfers the extracted authentication packet to the authentication phase section (215 of FIG. 3). When it is determined that the packet is an NCP packet 6111, the phase development section 213 transfers the NCP packet to the NCP phase section (216 of FIG. 3). The phase development section 213 executes the processing of this kind until there exists no data to be processed.

(4) The LCP packet 6105, the authentication packet 6108, and the NCP packet 6111 are transferred to the LCP phase section 214, the authentication phase section 215, and the NCP phase section 216 and then are concurrently processed in the respective phase processing sections, and each phase section executes the PPP processing (640 of FIG. 5) stipulated by RFC1661 as below.

(a) The LCP phase section 214 obtains an LCP option stipulated by RFC1661 from the received PPP packet (702 of FIG. 8) and determines whether or not each option is acceptable (703 of FIG. 8). After receiving a result of the determination of "703", the LCP phase section 214 creates an LCP reply packet (6505 of FIG. 9) and transfers (704 of FIG. 8) the packet to the phase combination section (217 of FIG. 3).

(b) The authentication phase section 215 similarly identifies an authentication policy in the PPP packet (705 of FIG. 8) to execute authentication processing according to the authentication policy (706 of FIG. 8). In the authentication processing, the authentication phase section 215 creates an authentication request message on the basis of an authentication policy determined by the communication system, issues an authentication request via the authentication server IF (204 of FIG. 3) to the authentication server (800 of FIG. 1), and then receives a replay message via the authentication server IF 204 from the authentication server 800. When the reply message is received from the authentication server 800, a check is made to determine whether or the authentication is successfully conducted (707 of FIG. 8). In a case of successful authentication, the authentication phase section 215 creates a reply packet indicating the authentication successful processing and the successful execution of authentication, and transfers (708 of FIG. 8) the packet to the phase combination section (217 of FIG. 3). Furthermore, if it is determined that the authentication has failed, the authentication phase section 215 creates a reply packet indicating the authentication failure processing and the failure of authentication, and transfers (709 of FIG. 8) the packet (6508 of FIG. 9) to the phase combination section 217.

(c) The NCP phase section 216 obtains an IPCP option from the PPP packet (710 of FIG. 8) to execute each option processing. Specifically, the NCP phase section 216 determines an IP address or the like to be assigned to the mobile station 100 according to the IPCP option (711 of FIG. 8). After the option processing is finished, the NCP phase section 216 creates an NCP reply packet (6511 of FIG. 9) to transfer (712 of FIG. 8) the packet to the phase combination section 217.

(d) The phase combination section (217 of FIG. 3) waits in the phase information combination processing (715 of FIG. 8) for necessary reply packets from the LCP phase section 214, the authentication phase section 215, and the IPCP phase section 216. When all packets are received, the phase combination section transfers data in which the respective PPP packets are combined with each other to the encapsulation section (218 of FIG. 3). The specific combination method and the specific configuration are similar to those of the phase combination section (117 of FIG. 2) and the phase information combination processing (1171 of FIG. 6) disposed in the station 100 described above.

(e) The encapsulation section (218 of FIG. 3) encapsulates the data including the respective PPP packets combined with each other into HDLC-Like-frame data (6500 of FIG. 9) in the same way as for the station 100 described above (716 of FIG. 8). The configuration and the operation of the encapsulation section 218 and the encapsulation processing 718 are similar to those of the encapsulation section (118 of FIG. 2) and the encapsulation processing (1181 of FIG. 6) disposed in the station 100. Although the layout of the frame data 6500 is similar to that of the frame data 6100 of FIG. 7, the contents of the LCP packet 6505, the authentication packet 6508, and the NCP packet 6511 are LCP-Configure-Ack 6507, PAP-Ack (Chap-succes) 6510, and IPCP-Configure-Nak 6513, which are reply data items to the respective PPP packets.

The data transmission section (219 of FIG. 3) changes the frame data 6500 into a wireless format stipulated by the communication system to transmit (650 of FIG. 5) the data via the wireless processing section (202 of FIG. 3), the provider-side PHY (201 of FIG. 3), the provider network (410 of FIG. 1), and the base station 400 to the station 100.

(5) The mobile station 100 develops, as in the operation on the receiving-side of the access server 200 described above, the frame data 6500 received via the wireless processing section (104 of FIG. 2), the data receiving section (111 of FIG. 2), the capsule development section (112 of FIG. 2), and the phase development section (113 of FIG. 2) into an LCP packet 6505, an authentication packet 6508, and an NCP packet 6511 and transfers the LCP packet 6505 to the LCP phase section 114, the authentication packet 6508 to the authentication phase section 115, and the NCP packet 6511 to the NCP phase section 116.

Each phase section executes PPP processing stipulated by RFC1661, and the processing is repeatedly executed until the negotiation of each phase is completed. In this example, since the NCP packet 6511 includes IPCP-Configure-Nak, the option of the cause of NAK is first identified, and then an NCP packet (6605 of FIG. 10) including IPCP-Configure-Request prepared by correcting the option is again transmitted to the access server 200 (660 of FIG. 4). Incidentally, by receiving LCP-Configure-Ack 6507 and PAP-Ack 6510, the respective phase processings have been finished in the LCP phase section 114 and the authentication phase section 115, and hence it is not required to transmit a new PPP packet to the access server 200. The phase combination section 117 is monitoring to determine whether or not each phase section has data for transmission. If the transmission is required only for the NCP phase section 116, the phase combination section 117 receives the NCP packet from the NCP phase section 116 and then transfers the NCP packet immediately to the encapsulation section 118 to conduct encapsulation as indicated by the frame data 6600 of FIG. 1 and then transmits the data via the data transmission section 119 and the wireless processing section 104 to the base station (660 of FIG. 4).

After having received the frame data 6600, the access server 200 executes processing according to the flow of FIG. 8 to create frame data (6700 of FIG. 11) including an NCP reply packet (6705 of FIG. 11) and transmits the data to the mobile station 100 (670 of FIG. 5). The mobile station 100 receives the frame data 6700 and then executes processing as described above to transfer the NCP packet 6705 to the NCP phase section 116. When it is determined that the NCP packet 6705 includes IPCP-Configure-Ack (6707 of FIG. 11), the PPP connection is completed, and then the station and the access server start data communication using the PPP (680 of FIG. 5).

As described above, according to the PPP, the operation is bidirectionally and concurrently conducted to communicate various PPP packets in the processing. In the above description, the processing is executed for a request packet from the mobile station 100. However, similarly, in concurrence with the operation described above, the access server 200 also transmits a request packet to the mobile station 100. Data 620 shown in the sequence diagram of FIG. 5 is the request packet from the access server 200, and this includes CHAP-Challenge described above in conjunction with the authentication phase. The signal is created as below to be processed between the station 100 and the access server 200.

FIG. 12 is an operation flow diagram showing an operation example (a transmission-side operation example) of the access server.

(1) After the wireless session 150 is established, the access server 200 instructs the PPP processing section (210 of FIG. 3) to start the PPP connection. In the PPP processing section 210, as in the PPP processing section (110 of FIG. 2) of the station 100; the LCP phase section 214, the authentication phase section 215, and the NCP phase section 216 respectively start processings. As described above, this is also implemented by setting predetermined authentication types and protocols for use in the access server 200 in the same way as for the station 100.

(a) The LCP phase section (214 of FIG. 3) determines an option to be used in the LCP packet according to the system setting value set in advance (2141 of FIG. 12), creates an LCP packet including the option according to RFC1661, and transfers (2142 of FIG. 12) the packet to the phase combination section (217 of FIG. 3).

(b) The authentication phase section (215 of FIG. 3) checks the system setting authentication policy set in advance (2151 of FIG. 12). In the embodiment, description is given of an example using CHAP. If it is determined that the authentication policy is CHAP (2152 of FIG. 12), the authentication phase section 215 creates an authentication packet including the CHAP-Challenge to transfer the packet to the phase combination section 218 (2154 of FIG. 12). Incidentally, if it is determined that the authentication policy is other than CHAP, there exists no packet to be created by the authentication phase section.

(c) The NCP phase section (216 of FIG. 3) like the other phase sections determines an option according to the system setting value set in advance (2161 of FIG. 12), creates an NCP packet including an IPCP option since the embodiment uses the IP, and then transfers (2162 of FIG. 12) the packet to the phase combination section (217 of FIG. 3).

(d) Subsequently, as in the operation of the access server described above, these PPP packets are combined with each other through the phase combination processing (715 of FIG. 12) of the phase combination section (217 of FIG. 3) to be encapsulated into HDLC-Like-frame data through the encapsulation processing (716 of FIG. 12) of the encapsulation section (218 of FIG. 3). The layout of the frame data is almost the same as that of the frame data 6100 shown in FIG. 7, and only the contents of the option vary between the respective packets according to operation stipulated by RFC1661. The created frame data is transmitted via the data transmission section (219 of FIG. 3), the wireless IF processing section (202 of FIG. 3), and the provider-side PHY (201 of FIG. 3) to the mobile station 100 (620 of FIG. 5).

(2) When the frame data is received, the mobile station 100 processes the respective PPP packets obtained by developing the HDLC-Like-frame data by the respective phase processing sections according to the policy of RFC1661, using the configuration and the operation similar to those described above. In each phase, a check is made to determine whether or not the requested option is acceptable and transmits a result of the determination in the form of a reply packet to the access server 200 using the configuration and the operation similar to those described above (630 of FIG. 5).

As described above, in the connection operation using the PPP, a control request and a replay are repeatedly communicated using PPP packets between the apparatuses such that when the negotiation is mutually finished, the PPP connection is completed and the packet communication using the PPP (680 of FIG. 5) is possible. In conjunction with the embodiment, although the connection operation has been described, the disconnection operation can also be implemented using the similar configuration and processing. Furthermore, the HDLC-Like-frame data of RFC1662 is used for the encapsulation of the data link in the example of the embodiment. However, since the present invention is independent of the capsule layout, it is also possible to apply the present invention to a communication network using PPP over Ethernet (PPPoE) stipulated by RFC2516.

In the above description of the embodiment, the respective apparatuses of the communication system concurrently execute the respective phase processings of the LCP, authentication, and NCP phases. However, in an actual system, there possibly occurs, for example, a situation in which it is convenient to conduct the authentication phase after whether the authentication policy is set as PAP or CHAP is determined in the LCP phase processing. In such situation, if the authentication phase and the NCP phase are concurrently started after the LCP phase processing is completed, the connection time can be reduced. FIG. 13 is an operation sequence diagram to explain another operation of the communication system and shows an operation in which the authentication phase and the NCP phase are started in parallel after the LCP phase is conducted. Moreover, FIG. 14 is a frame layout diagram showing a layout example of another frame data item which the mobile station transmits to the access server, and FIG. 15 is a frame layout diagram showing a layout example of another frame data item which the access server transmits to the mobile station.

Specifically, it is only necessary to set, in addition to the information such as the beforehand determined authentication policy and protocols for use, also information items regarding phases to be individually operated to the mobile station 100 and the access server 200. In the above example, it is only necessary to beforehand set that the LCP phase is to be individually executed.

When the user of the station 100 issues a call request, a wireless session is established in the same way as for the above embodiment (150 of FIG. 3) and the PPP connection starts between the mobile station 100 and the access server 200. In this situation, since the mobile station 100 and the access server 200 have been in the known state, the respective LCP phase sections (114 of FIG. 2; 214 of FIG. 3) are first operated to complete the LCP phase stipulated by RFC1661 similar to that of the conventional communication system (900 of FIG. 13).

Thereafter, the mobile station 100 operates the authentication phase section (215 of FIG. 2) and the NCP phase section (216 of FIG. 2) in parallel as in the above example (reference is to be made to FIG. 6) and creates frame data (9100 of FIG. 14) in which an authentication packet according to the authentication policy determined in the LCP phase 900 is combined with an NCP packet including IPCP-Configure-Request to transmit the data to the access server 200 (910 of FIG. 9).

The access server 200 develops the frame data 9100 from the mobile station 100 into an authentication packet and an IPCP packet as in the above embodiment (FIG. 8) and starts the respective processings in parallel. When the respective processings (911 of FIG. 13) are finished, the access server 200 creates frame data in which results of the processings are combined with each other (9120 of FIG. 15) to transmit the data to the mobile station 100 (912 of FIG. 13). Incidentally, it is also possible to combine IPCP-Configure-Request from the access server to the mobile station.

The mobile station 100 develops the PPP reply packets of the respective processings from the frame data 9120 into the respective phase processing sections to concurrently execute the processings. For the authentication processing, the authentication is completed since the packet is a PAP-ACK packet, and in the IPCP processing, an IP address stored in the IPCP-Configure-NAK option is set. Furthermore, if an IPCP-Configure-Request packet has been combined, the IPCP processing is executed.

After the respective phase processings are finished, if there exists a packet to be transmitted separately, the mobile station 100 combines the packet to transmit the packet to the access server 200. This operation is also similar to the operation described in detail in conjunction with the above embodiment. The present embodiment (FIG. 13) shows an operation example in which the station 100 combines an IPCP-Configure-Request packet, including as the option an IP address assigned from the access server 200, with IPCP-Configure-ACK as a reply to the IPCP-Configure-Request and transmits the combination to IPCP-Configure-Request (913 of FIG. 13). The access server 200 having received the data processes the respective PPP packets and transmits IPCP-Configure-ACK as a reply to the IPCP-Configure-Request to the mobile station 100, which terminates the NCP phase processing (914 of FIG. 13). At this point, the authentication phase (901 of FIG. 13) and the NCP phase (902 of FIG. 13) are completed, and hence it is thereafter possible to conduct the packet communication using the PPP (915 of FIG. 13).

As described above, when the system beforehand determines and stores the option, it is possible to start processings in parallel by appropriately combining the LCP, authentication, and NCP with each other, and also, by appropriately combining PPP packets with each other, and hence the PPP connection time can be reduced as compared with the conventional PPP connection. Particularly, the mobile communication includes a handover operation to execute re-connection using the PPP, and hence the reduction in the PPP connection time leads to an advantage of reduction in the uncommunicable time during the PPP re-connection in the mobile communication.

The communication system described above is configured such that frame data in which PPP packets stipulated by RFC1661 are combined with each other to be communicated between the apparatuses, and the respective apparatuses develop the frame data into individual PPP packets to concurrently executes processings. As described above, the PPP packets are stipulated by RFC1661 such that the PPP packet types can be identified as an LCP packet and an authentication packet according to the value of the first protocol field (511 of FIG. 4). However, actually, there exists a value not defined by RFC1661, and even a PPP packet created with the protocol field 511 including the value can be communicated.

In consideration thereof, a new connection shortening PPP packet is defined using a value not defined by RFC1661 in the communication system of the present invention to include in one PPP packet information such as options required for the LCP, authentication, and NCP phase processings. By communicating the new PPP packet between the apparatuses, the number of signals (the number of sequences) communicated in the connection operation is reduced, which also leads to a configuration to further reduce the communication time.

FIG. 16 is a frame layout diagram showing a layout example of frame data communicated between the access server and the station and shows a layout example of frame data including a connection shortening PPP packet defined as a new packet. Additionally, FIG. 17 is an operation sequence diagram to explain an operation example of the communication system and shows an operation example in a case in which a connection shortening PPP packet is used.

In the embodiment, a PPP packet in which the protocol field 804 employs "F021" not used in RFC1661 is used as a connection shortening PPP packet. Naturally, since "F000" to "FFFF" are not used in RFC1661, a value other than "F021" may also be employed. The configurations of functional blocks disposed in the station 100 and the access server 200 are the same as those of the above embodiment.

When a wireless session is established (810 or FIG. 15), the station 100 issues a connection start instruction to the PPP processing section (110 of FIG. 2), and then the PPP connection between the mobile station 100 and the access server 200 is started as in the above embodiment. Specifically, the station 100 makes the respective phase sections, i.e., the LCP phase section (114 of FIG. 2), the authentication phase section (115 of FIG. 2), and the NCP phase section (116 of FIG. 2), operate in parallel. The phase combination section (117 of FIG. 2) edits the LCP, authentication, and NCP information items outputted from the respective phase processing sections to insert the connection shortening PPP packet 802 using "F021" in the protocol filed 804, and then transmits frame data 6800 (811 of FIG. 15) via the encapsulation section (118 of FIG. 1), the data transmission section (119 of FIG. 1), and the wireless processing section (104 of FIG. 1) to the access server 200 to request the LCP, authentication, IPCP processings.

The access server 200 transfers the frame data 6800 which the wireless IF processing section (202 of FIG. 3) has received via the provider-side PHY (201 of FIG. 3) to the PPP processing section (210 of FIG. 3). The PPP processing section 210 transfers the connection shortening PPP packet 802 via the data receiving section (211 of FIG. 3) and the capsule development section (212 of FIG. 3) to the phase development section (213 of FIG. 3) such that the phase development section 213 identifies the protocol in the protocol field of the PPP packet. As a result of the identification, if it is determined that the packet is the connection shortening PPP packet 802 defined by the system, the phase development section 213 extracts the LCP, authentication, and NCP information items contained in the packet and transfers the extracted data items respectively to the LCP phase section (214 of FIG. 3), the authentication phase section (215 of FIG. 3), and the NCP phase section (216 of FIG. 3). The respective phase processing sections concurrently execute the respective processings (814 of FIG. 16) and transfers information items of the phase processing results to the phase combination section (217 of FIG. 3). The phase combination section 217 inserts the result information items received from the respective phase processing sections in the connection shortening PPP packet 802 using "F021" to transmit frame data 6700 as a reply of the LCP, authentication, and ICPC processing results via the encapsulation section (218 of FIG. 3), the data transmission section (219 of FIG. 3), the wireless IF processing section (202 of FIG. 3), and the provider-side PHY (201 of FIG. 3) to the mobile station 100 (812 of FIG. 15). Through the above operation, the PPP connection is completed, and the packet processing using the PPP can be conducted between the mobile station 100 and the access server 200 (813 of FIG. 17).

As described above, a number defining a connection shortening packet is assigned to a protocol of a PPP packet and then the LCP, authentication, and NCP information items are contained as the packet contents to communicate the information items of three phases by one PPP packet between the station and the access server, and hence the connection time can be reduced.

Moreover, according to a similar idea, a number defining a connection shortening packet is assigned to a code of a PPP packet (e.g., code=0) and then the LCP, authentication, and NCP information items are contained as the packet contents to communicate the information items of three phases by one PPP packet between the station and the access server, and hence the connection time can also be further reduced.

Although the description has been given of embodiments, the present invention is not restricted by the embodiments, and it is obvious that those skilled in the art can change or modify the embodiments within the spirit and scope of the accompanying claim of the present invention.

Figure 1:
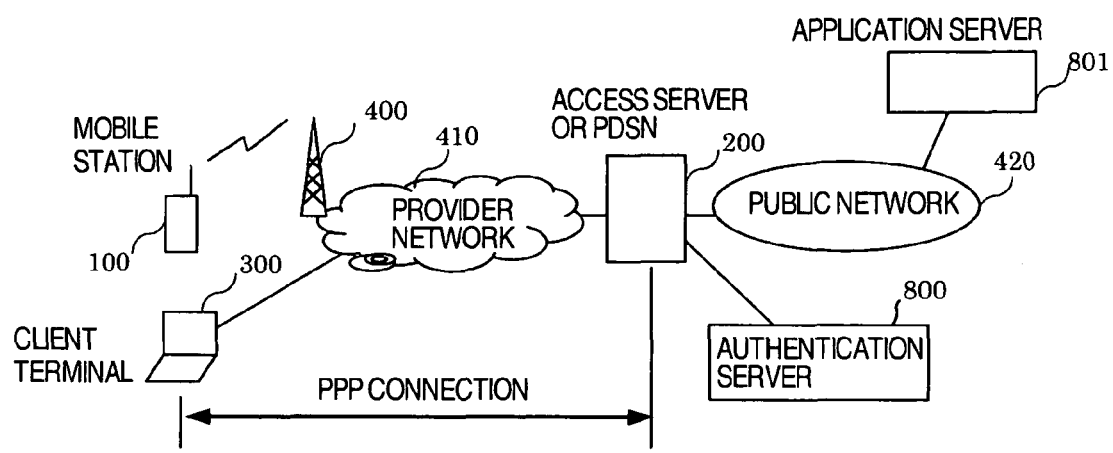
[FIG. 1] Network configuration diagram showing a configuration example of a communication system using a communication terminal apparatus and a network access apparatus.
Figure 2:
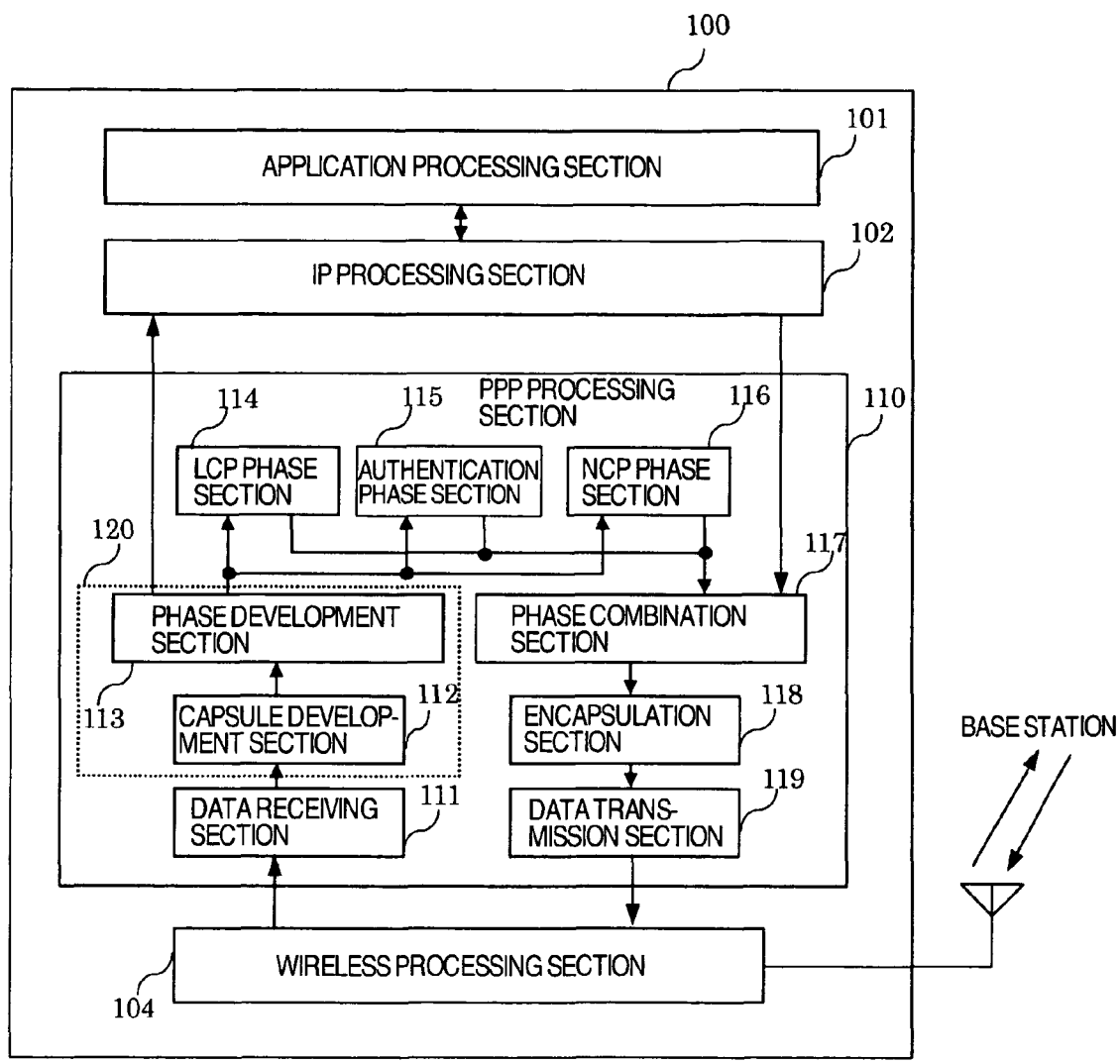
[FIG. 2] Functional configuration diagram showing a functional configuration example of a mobile station.
Figure 3:
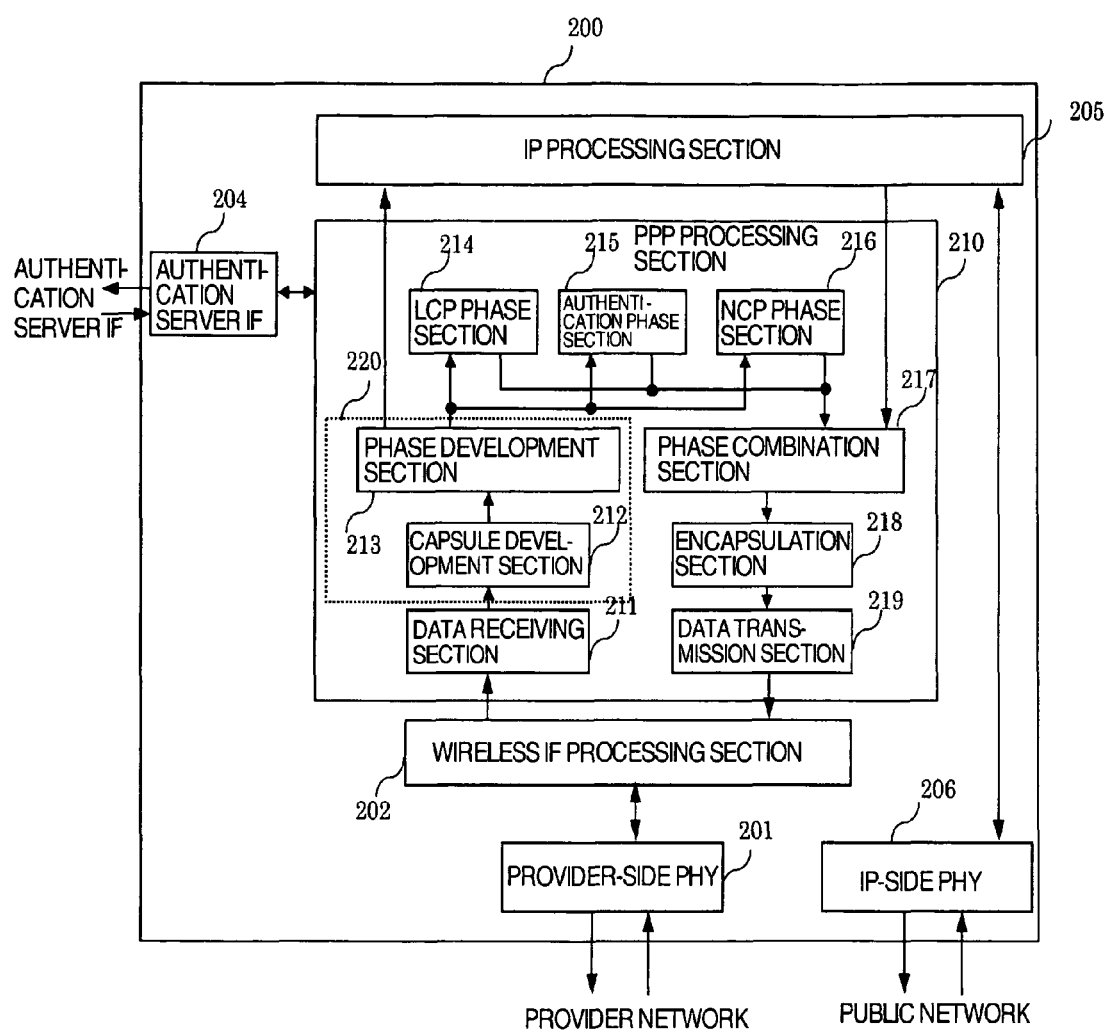
[FIG. 3] Functional configuration diagram showing a functional configuration example of a network access apparatus (access server).
Figure 4:
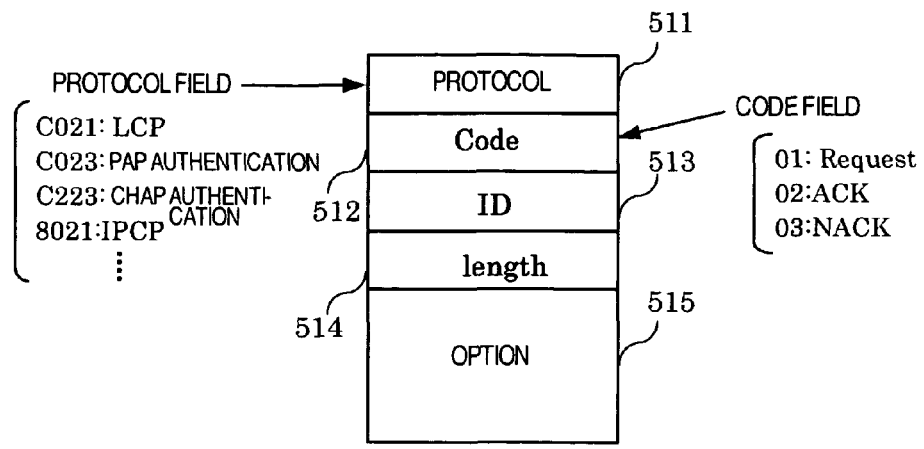
[FIG. 4] Frame layout diagram showing a frame layout example of a PPP packet.
Figure 5:
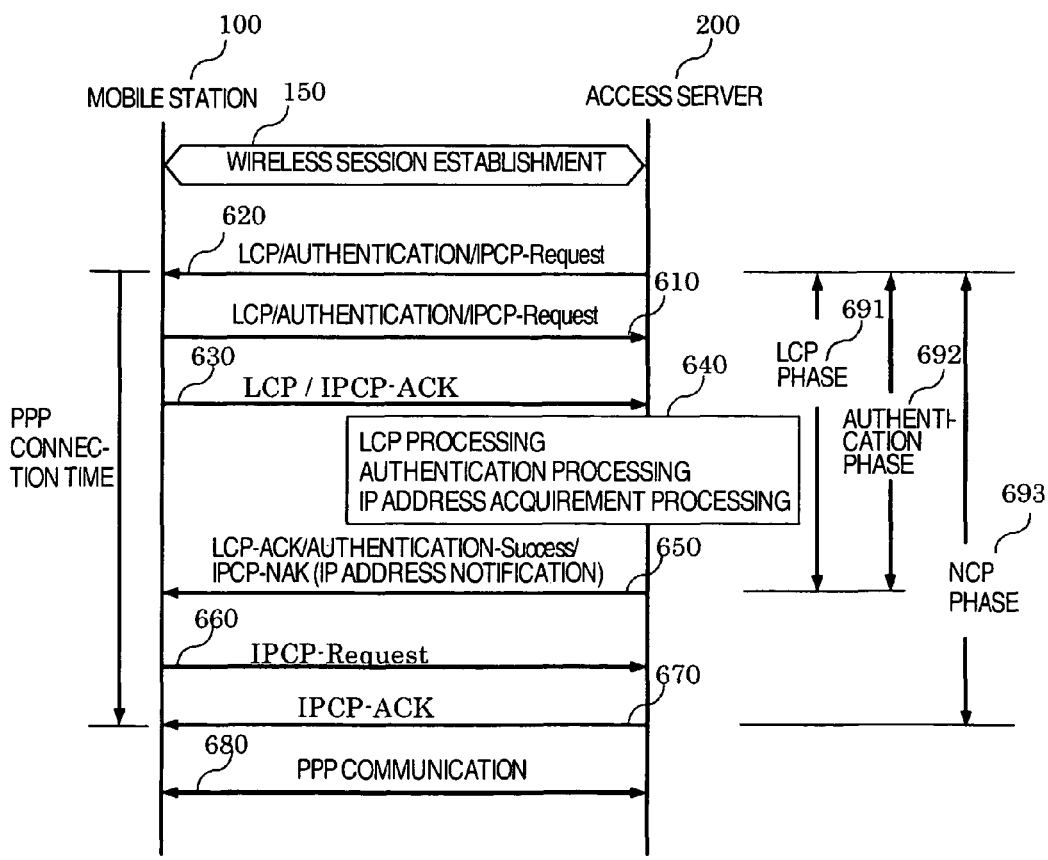
[FIG. 5] Operation sequence diagram to explain an operation example of a communication system.
Figure 6:
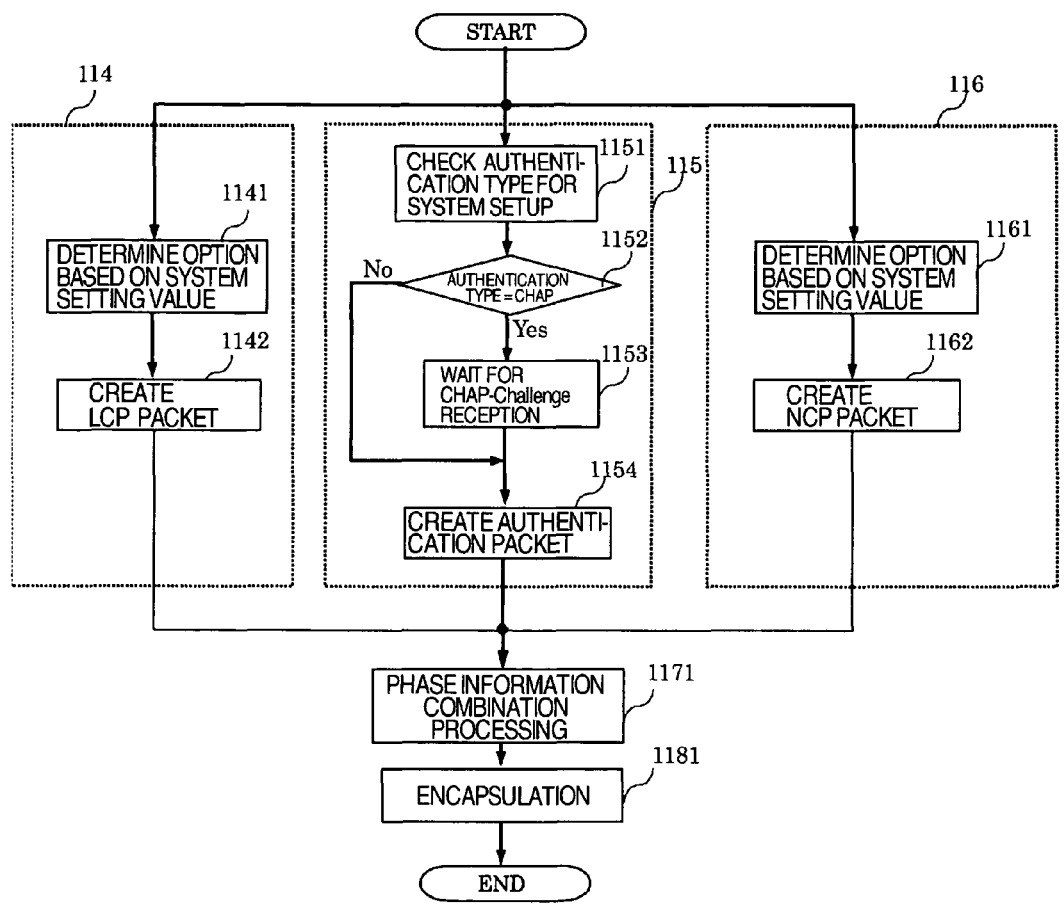
[FIG. 6] Operation flowchart showing an operation example (transmission-side operation example) of a station.
Figure 7:
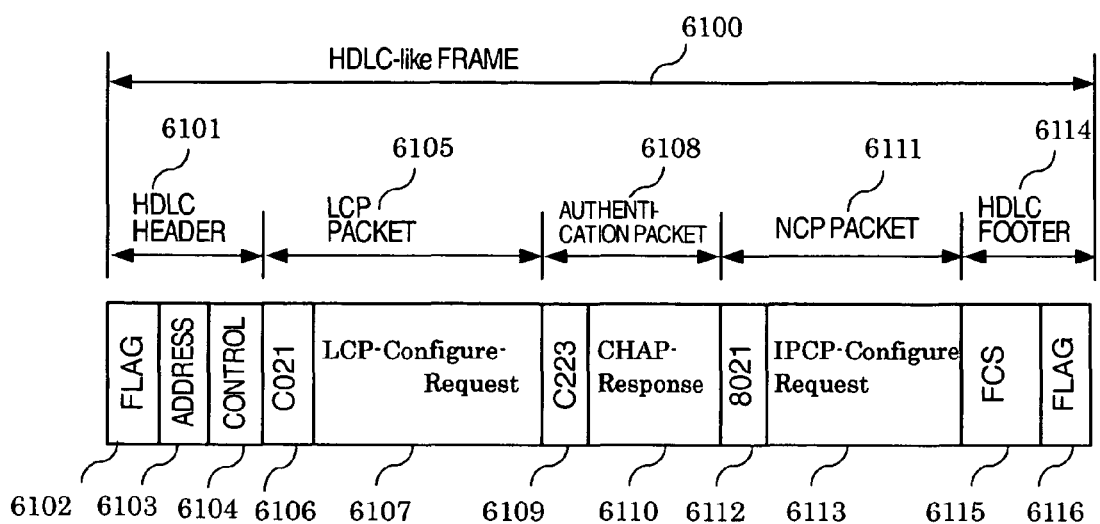
[FIG. 7] Frame layout diagram showing a layout example of frame data which a mobile station transmits to an access server.
Figure 8:
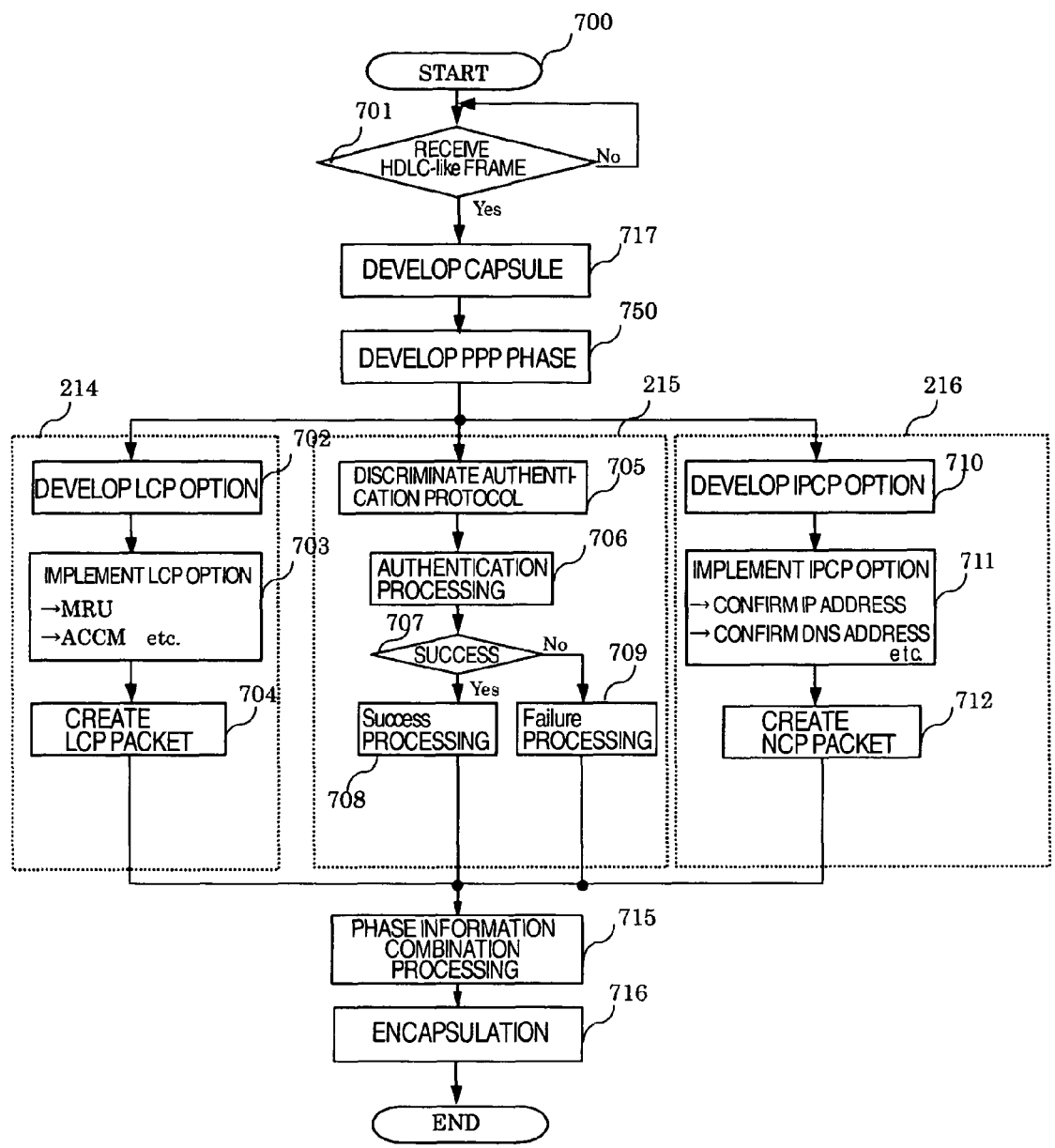
[FIG. 8] Operation flowchart showing an operation example (receiving-side operation example) of an access server.
Figure 9:
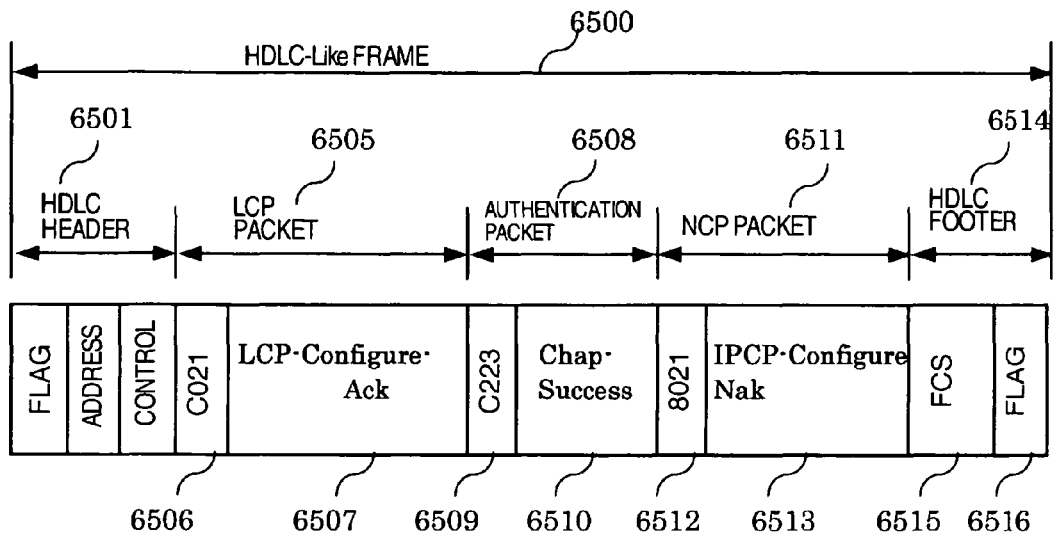
[FIG. 9] Frame layout diagram showing a layout example of frame data which an access server transmits to a mobile station.
Figure 10:
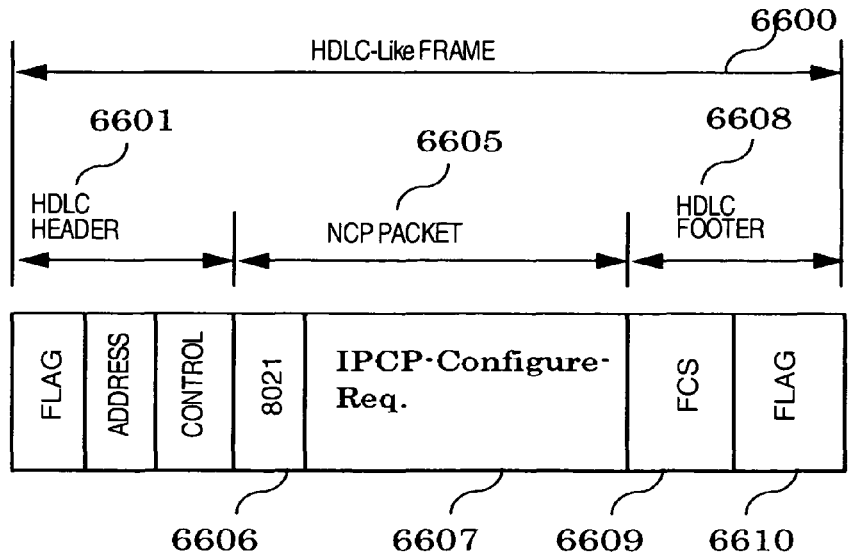
[FIG. 10] Frame layout diagram showing another layout example of frame data which a mobile station transmits to an access server.
Figure 11:
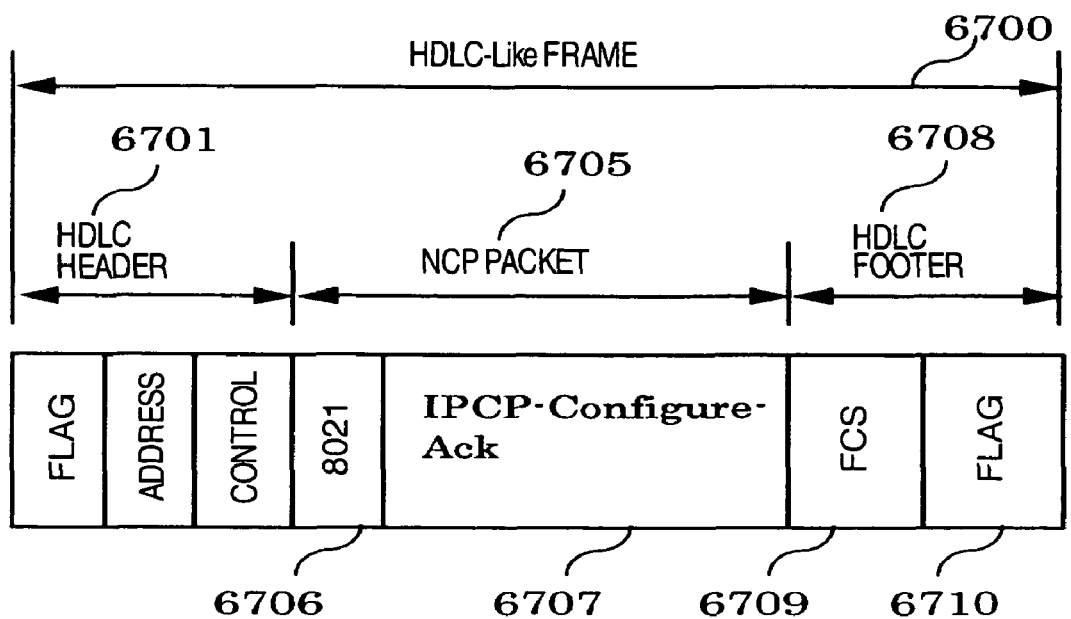
[FIG. 11] Frame layout diagram showing another layout example of frame data which an access server transmits to a mobile station.
Figure 12:
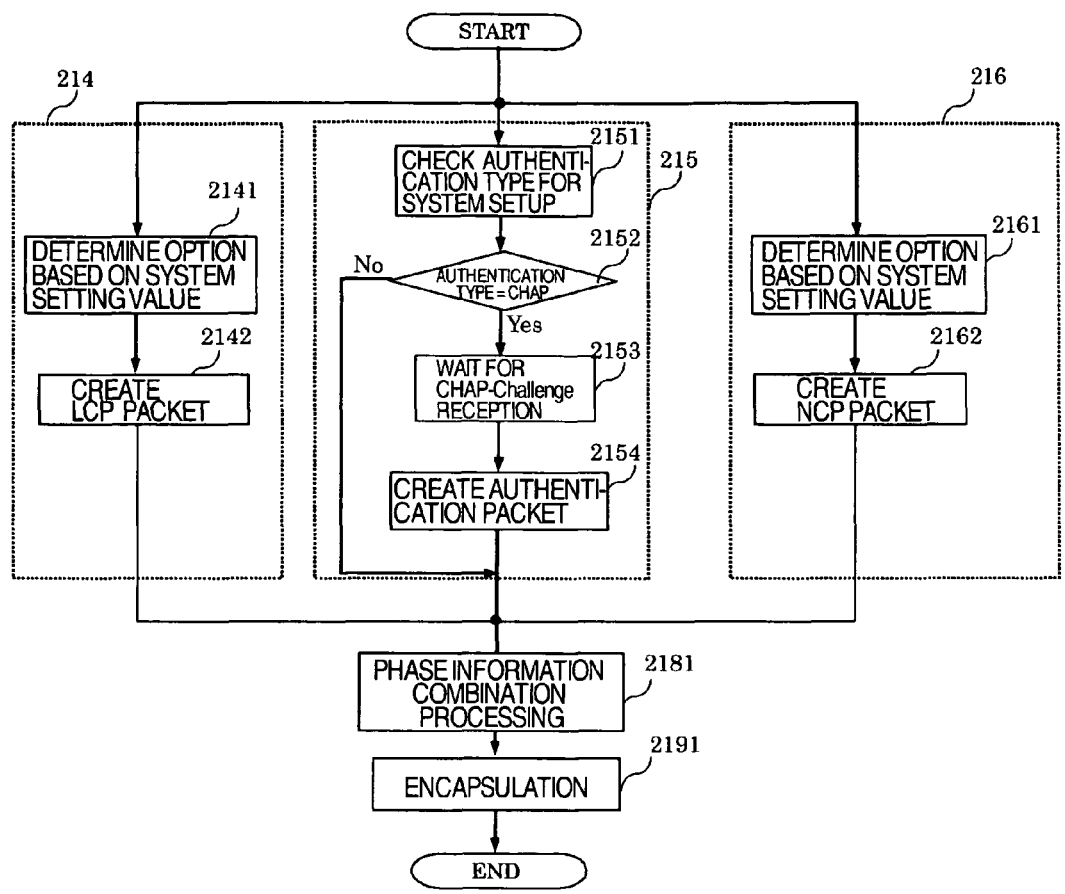
[FIG. 12] Operation flowchart showing an operation example (transmission-side operation example) of an access server.
Figure 13:
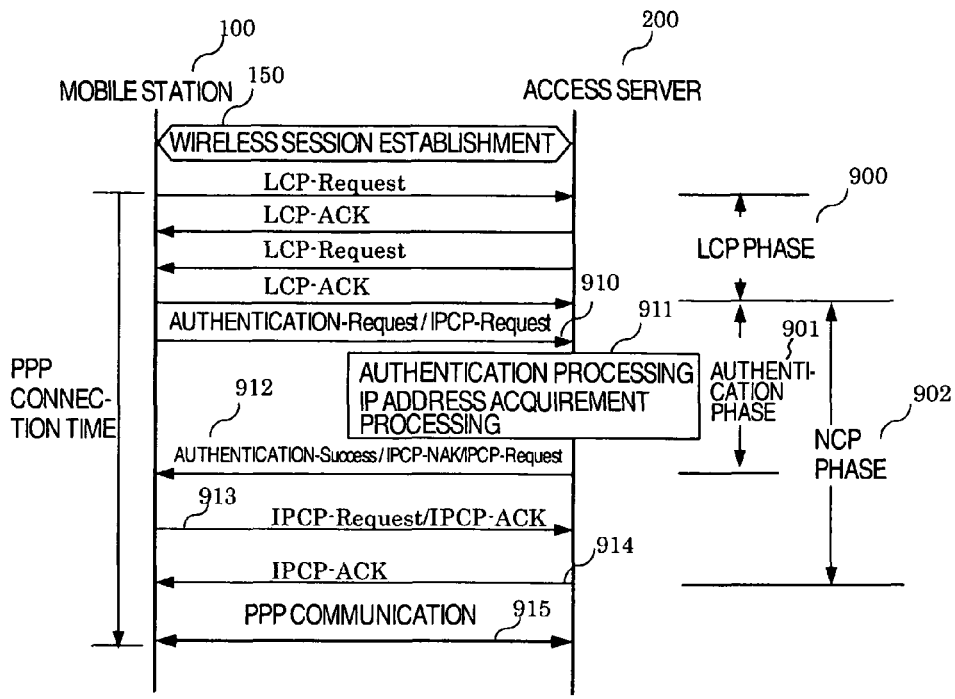
[FIG. 13] Operation sequence diagram to explain another operation example of a communication system.
Figure 14:
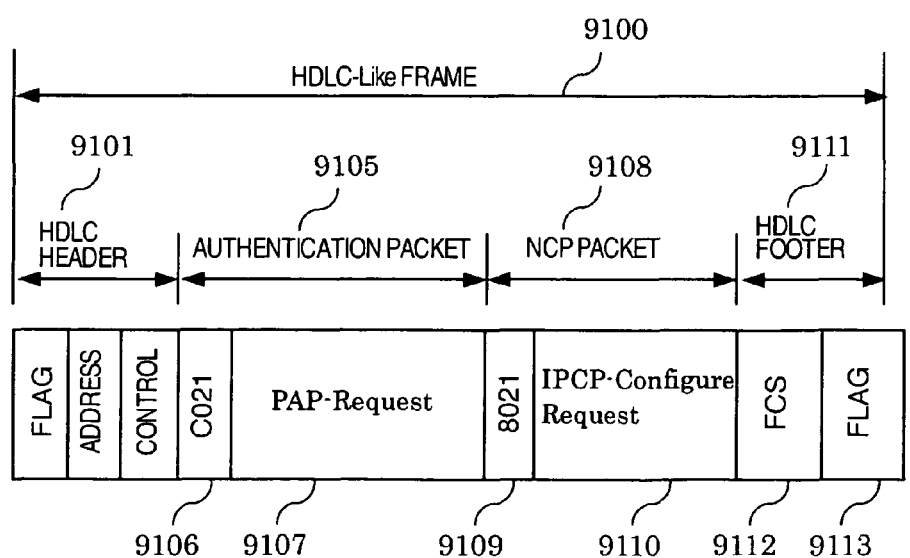
[FIG. 14] Frame layout diagram showing another layout example of frame data which a station transmits to an access server.
Figure 15:
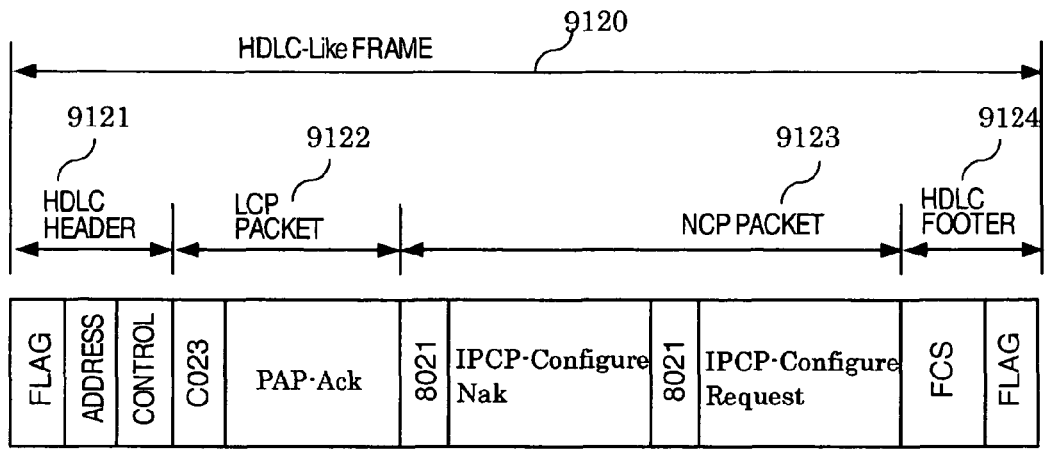
[FIG. 15] Frame layout diagram showing another layout example of frame data which an access server transmits to a mobile station.
Figure 16:
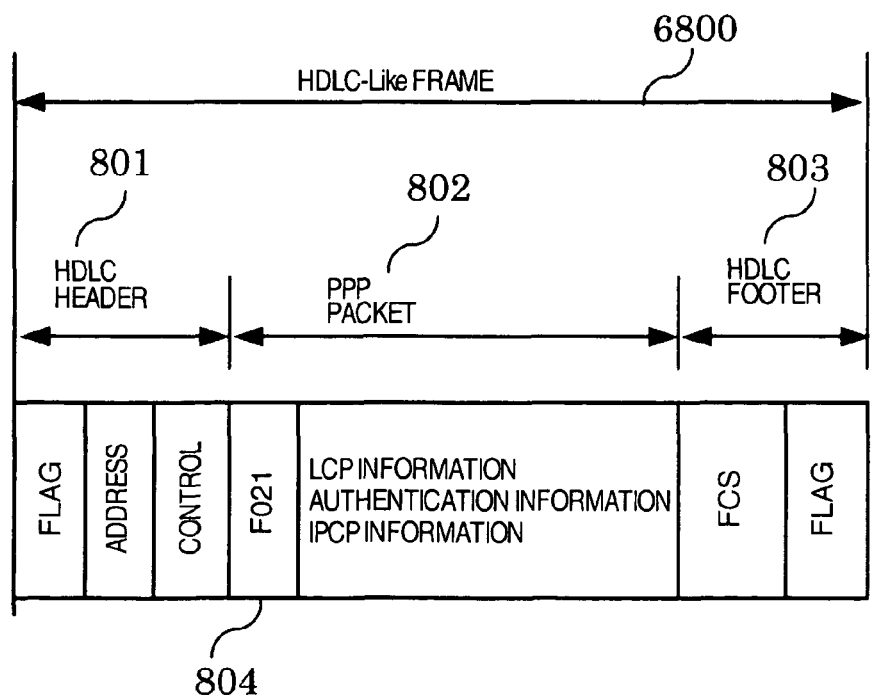
[FIG. 16] Frame layout diagram showing a layout example of frame data communicated between an access server and a mobile station.
Figure 17:
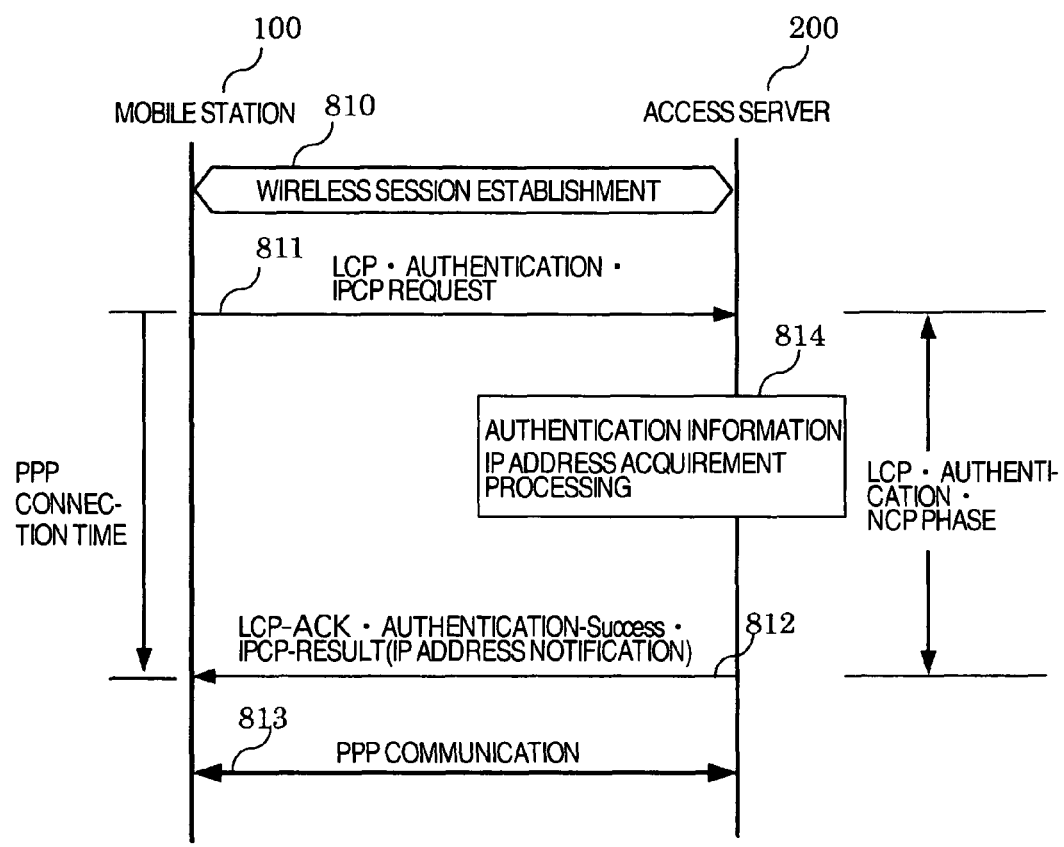
[FIG. 17] Operation sequence diagram to explain another operation example of a communication system.

The invention claimed is:

1. A communication terminal apparatus to be connected to a communication network through a control operation using a Point to Point Protocol (PPP), comprising:
   a PPP processing section for creating, in accordance with RFC 1661, a Link Control Protocol (LCP) information item, an authentication information item, and a Network Control Protocol (NCP) information item regarding the PPP based on an authentication policy and a layer 3 protocol type which are previously stored;
a phase information combination section for combining the LCP information item, the authentication information item, and the NCP information item with each other to create data;
an encapsulation section for encapsulating data combined by the phase information combination section into one frame conforming to a link layer used by the communication network; and
a data transmission section to transmit the data encapsulated by the encapsulation section via the communication network to a communication apparatus as a destination.

2. A communication terminal apparatus according to claim 1, wherein the previously stored authentication policy and the layer 3 protocol type are previously stored in memory of the communication terminal apparatus.

3. A communication terminal apparatus according to claim 1, wherein the authentication policy and the layer 3 protocol type which are previously stored, are previously stored in plural apparatuses distributed in the communication network, including the communication terminal apparatus.

4. A communication terminal apparatus to be connected to a communication network using a Point to Point Protocol (PPP), comprising:
a plurality of phase processing sections for executing a plurality of control processings for the PPP connection in parallel;
a data receiving section for receiving, from a communication partner, data which has been made by combining a plurality of phase information items in conformity with RFC 1661 and encapsulating the combined phase information items into one frame conforming to a link layer used by the communication network;
a phase information development section for discriminating respective phase information items in the data received by the data receiving section and transmitting the respective phase information items to respective one of the phase processing sections conforming thereto;
a phase information combination section for receiving the phase information items in conformity with RFC 1661 created by respective ones of the plural phase processing sections and combining the plural phase information items with each other to create data;
an encapsulation section for encapsulating data combined by the phase information combination section to one frame conforming to the link layer used by the communication network; and
a data transmission section for transmitting the data capsulated by the encapsulation section via the communication network to the communication partner.

5. A communication terminal apparatus according to claim 4, wherein the plurality of phase processing sections include a Line Control Protocol (LCP) phase processing section, an authentication phase processing section, and a Network Control Protocol (NCP) phase processing section.

6. A communication terminal apparatus according to claim 4, wherein the phase information combination section combines an LCP information item, an authentication information item, and an NCP information item with each other.

7. A communication terminal apparatus according to claim 5, wherein the phase information combination section combines an LCP information item, an authentication information item, and an NCP information item with each other.

8. A network access apparatus to connect a communication terminal apparatus to a communication network using a Point to Point Protocol (PPP), comprising:
a PPP processing section for creating, in accordance with RFC 1661, a Link Control Protocol (LCP) information item, an authentication information item, and a Network Control Protocol (NCP) information item regarding the PPP based on an authentication policy and a layer 3 protocol type which are previously stored;
a phase information combination section for combining the LCP information item, the authentication information item, and the NCP information item regarding the PPP with each other to create data;
an encapsulation section for encapsulating data created by the phase information combination section to one frame conforming to a link layer used by the communication network; and
a data transmission section to transmit the data encapsulated by the encapsulation section to the communication terminal apparatus.

9. A network access apparatus according to claim 8, wherein the previously stored authentication policy and the layer 3 protocol type are previously stored in memory of the network access apparatus.

10. A network access apparatus according to claim 8, wherein the authentication policy and the layer 3 protocol type which are previously stored, are previously stored in plural apparatuses distributed in the communication network, including the network access apparatus.

11. A network access apparatus to connect a communication terminal apparatus to a communication network using a Point to Point Protocol (PPP), comprising:
a plurality of phase processing sections for executing a plurality of control processings for the PPP connection in parallel;
a data receiving section for receiving, from a communication terminal apparatus, data which has been made by combining a plurality of phase information items in conformity with RFC 1661 and encapsulating the combined phase information items into one frame conforming to a link layer used by the communication network;
a phase information development section for discriminating the respective phase information items in the combined-data received by the receiving section and transmitting the respective phase information items to respective one of the phase processing section conforming thereto;
a phase information combination section for combining the phase information items conforming to RFC 1661 created by the respective plural phase processing sections and combining the plural phase information items with each other;
an encapsulation section for encapsulating data combined by the phase information combination section into one frame conforming to the link layer used by the communication network; and
a data transmission section for transmitting the data encapsulated by the encapsulation section via the communication network to the communication terminal apparatus.

12. A network access apparatus according to claim 11, wherein the plurality of phase processing sections include an LCP phase processing section, an authentication phase processing section, and an NCP phase processing section.

13. A network access apparatus according to claim 11, wherein the phase information combination section combines an LCP information item, an authentication information item, and an NCP information item with each other.

14. A network access apparatus according to claim 12, wherein the phase information combination section combines an LCP information item, an authentication information item, and an NCP information item with each other.

15. A communication method of conducting communication between a communication terminal apparatus and a network access apparatus connected to a communication network using a Point to Point Protocol (PPP), the method comprising:
  by a transmission-side apparatus, creating, in accordance with RFC 1661, a plurality of information items regarding a plurality of control phases for the PPP connection based on an authentication policy and a layer 3 protocol type which are previously stored; and transmitting first data created by combining the plural information items regarding the plurality of control phases and encapsulating the combined information items into one frame conforming to a link layer used by the communication network, via the communication network to a receiving-side apparatus; and
  by the receiving-side apparatus, discriminating the respective information items regarding to the respective control phases in the received first data regarding to the plurality of control phases; executing a plurality of control processings corresponding to the respective information items in parallel; and creating second data created by combining information items in conformity with RFC 1661 regarding plural control results of the plurality of control processings and encapsulating the second data into one frame conforming to the link layer used by the communication network to transmit the encapsulated second data via the communication network to the transmission-side apparatus.

16. A communication method according to claim 15, wherein the previously stored authentication policy and the layer 3 protocol type are previously stored in memory of the transmission-side apparatus.

17. A communication method according to claim 15, wherein the authentication policy and the layer 3 protocol type which are previously stored, are previously stored in plural apparatuses distributed in the communication network, including the transmission-side apparatus.

\* \* \* \* \*